United States Patent Office 3,403,672
Patented Oct. 1, 1968

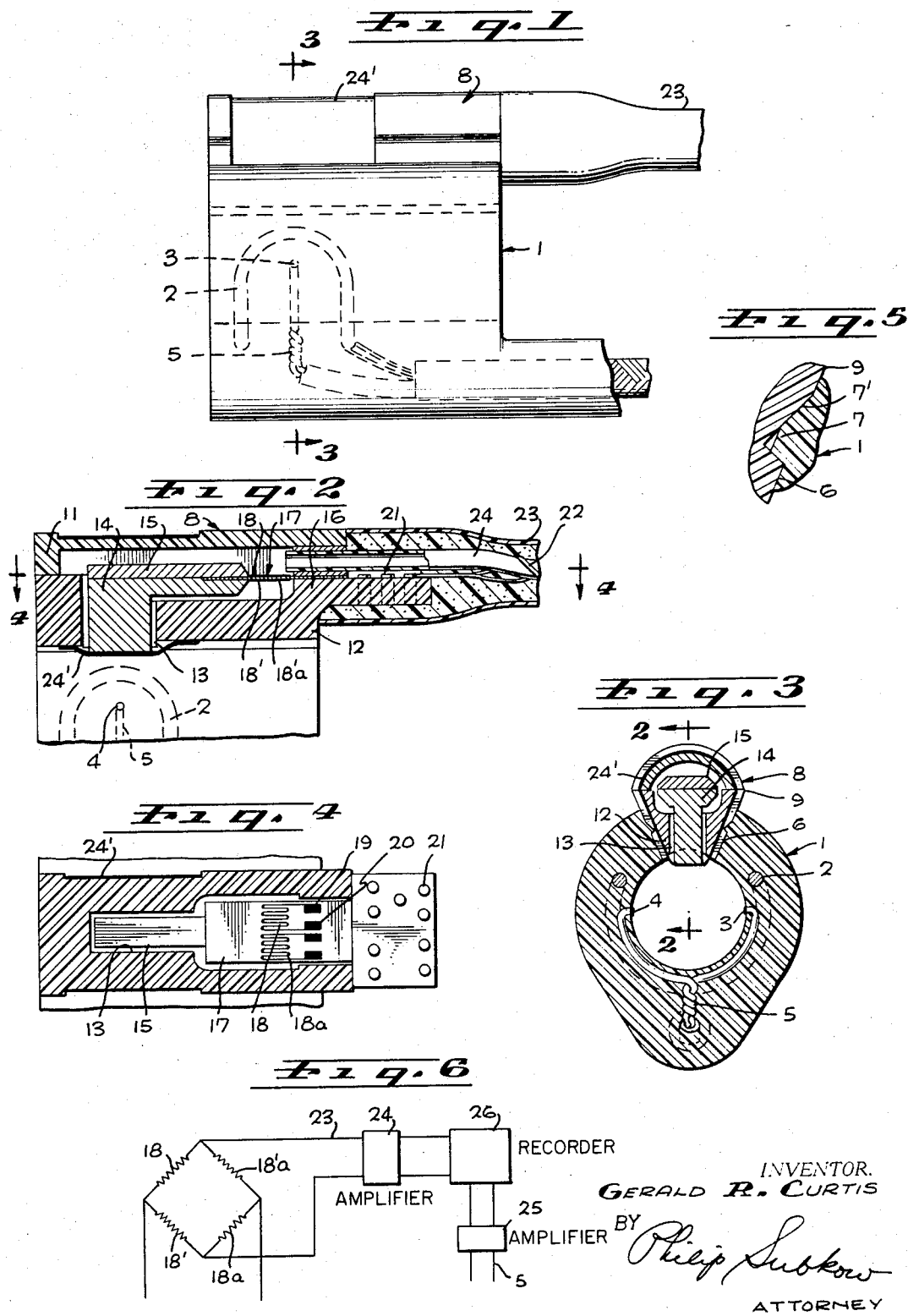

3,403,672
PERIARTERIAL BLOOD FLOW AND BLOOD PRESSURE MEASURING DEVICES
Gerald R. Curtis, La Canada, Calif., assignor to Statham Instruments, Inc., Los Angeles, Calif., a corporation of California
Filed Feb. 23, 1965, Ser. No. 434,513
4 Claims. (Cl. 128—2.05)

ABSTRACT OF THE DISCLOSURE

A lumen including an elongated tubular wall member with a slot throughout the complete length is disposed in surrounding relationship to a blood vessel, the blood flow and pressure of which it is desired to measure. Flow rate sensors are disposed within the body wall of the member in sensing relation to the blood vessel. A plug is fittingly received within the slot with an inner surface including a diaphgram contacting the blood vessel. Pressure changes of the blood vessel distend the diaphragm and an associated lever body carrying a set of strain gage sensors. The diaphragm and flow rate sensors are disposed at the same portion of the blood vessel as the flow rate sensors whereby flow rate and pressure are determined at the same point. External electrical apparatus is connected to the flow rate sensors and strain gages for interpreting and/or display.

This invention is directed to and has for its object means for the measurement of the arterial blood flow rate and the measurement of the blood pressure at the locality at which said blood flow rate is measured. It also has for its object improvements of implantable means for the measuring of blood pressure with or without measurement of blood flow.

Implantable blood flow meters are well known and have been in use for many years. Such devices have been described in the following articles to which reference is made for further description of such devices. "Miniaturization of the Electromagnetic Blood Flow Meter and Its Use for the Recording of Circulatory Responses of Conscious Animals to Sensory Stimuli," by Kolin and Kado; Proceedings of the National Academy of Sciences, vol. 45, No. 8, pages 1312–1321, August 1959; "Single Coil Coreless Blood Flow Meters" by Kolin and Wisshaupt; IRE Transactions on Biomedical Electronics, vol. BME-10, pages 60–67, April 1963.

It is frequently desirable to have, in addition to the volumetric flow rate measurement and the measurement of the flow rate variations, a simultaneous measurement of the blood pressure and blood pressure variations. While implantable blood pressure measuring devices have been suggested in the prior art, they have the difficulty that they are not combined with blood flow measuring devices. Use of such blood pressure measuring devices, together with the blood flow measuring device of the prior art, have the difficulty that they require the implantation of two separate devices. Even if placed adjacent to each other on the artery, they are not at the same locality and do not measure the blood flow rate and the frequency of the variation of blood flow, and also the blood pressure and the frequency responsive to blood pressure associated with blood flow rate at the same locality.

The artery includes a muscle wall portion, and thus is an irritable member. The implantation of a periarterial device causes a reaction of the artery wall, and thus affects the local blood pressure. Where the blood pressure devices are spaced apart from each other, there is no way of being sure that the blood pressure measuring device is influenced by the same factors as a blood flow meter under such conditions.

It is thus an object of my invention to combine the periarterial blood pressure measuring means together with the blood flow measuring device in one unit without substantially increasing the volume occupied by the blood pressure volume flow device over that of the flow meter without the blood pressure device.

It is a particular object of my invention to employ a periarterial blood pressure transducer combined with electromagnetic flow meters referred to above, and to avoid the introduction of extraneous magnetic and electrical fields to cause perturbations or other effects which will introduce an artifact error into the blood pressure or the blood flow measurement.

As is well known, in electromagnetic flow determination devices, the output levels of the devices are very small and are strongly dependent on the nature of the magnetic field which is employed in the unit. Accordingly, great care is now used in electromagnetic flow meters for isolating and minimizing extraneous electrical and magnetic fields.

By the use of the device of my invention, more fully described below, I may obtain a blood pressure measurement by telemetric methods without introducing electrical fields or magnetic fields which would effect the performance of the electromagnetic blood flow measuring device.

While this is an advantage in using electromagnetic flow meters for the simultaneous measurement of blood pressure and blood flow at substantially the same locality, other types of blood flow measuring devices such as the acoustic methods, for example, those employing sound waves in the audible or lower or higher frequency range such as ultrasonic waves, may be utilized with advantage. Such flow meters are known to the above literature.

These and other objects of my invention will be further described in connection with the drawings of which:

FIG. 1 is a side view of the periarterial blood pressure flow measuring device of my invention;
FIG. 2 is a section taken on line 2—2 of FIG. 3;
FIG. 3 is a section taken on line 3—3 of FIG. 1;
FIG. 4 is a fragmentary section on line 4—4 of FIG. 2;
FIG. 5 is a fragmentary enlarged view; and
FIG. 6 is a schematic diagram of the recorder connections.

The lumen 1 made of a suitable plastic material has embedded within it the bent coil 2 of conductor wires suitably insulated from each other. The coil extends about 240° of the lumen and has suitable conductor connections for energizing the coil. The electrodes 3 and 4 are positioned diametric to each other and transverse to the direction of the magnetic field established by the coil 2 when energized. The design may be made so that the direction of the field is substantially uniform across the cross section of the core of the lumen, and substantially perpendicular to the electrical field between the electrodes 3 and 4.

The electrodes have an exposed metallic surface at the inner surface of the lumen so that they make direct contact with the artery when the flow meter is inserted around the artery, as will be described below. They are connected by wires 5 so positioned and intertwined as to minimize quadrature error. Alternative to this single coil, I may use the two coil form also described in the above Kolin and Kado and Kolin and Wisshaupt articles. Reference may be had to the above articles for further description of the construction of the lumen and the position of the wires and electrodes. No novelty is claimed for the structure to the degree above identified. It is common with previously formed lumen forms. In the conventional flow meter, using either of these coils, the lumen is split at 6 so that the artery may be entered and the split portion is closed by a shutter which is inserted into the split section.

I modify this structure in the following manner. The ends of the lumen at the split section 6 are formed with ridges 7 and the split place is closed by a plug 8.

The plug 8 is formed of a body portion having sides 9 and an end 11 and a bottom portion 12. The end of the bottom portion 12 is spaced from the end 11 to provide an opening 13. The head 14 is positioned in the opening and is connected to the arm 15 which in turn is connected to the bottom portion 12 at 16 by a flat spring 17. The head 14 projects through the opening and depends below the bottom surface of 12 and 11. The head 14 is closely adjacent to the plane of the electrodes and may be made to include the said plane. The pressure transducer is preferably of a length and cross sectional design to completely fill the slot in the lumen. Strain elements to wit electrical resistance elements 18 whose resistance is a function of strain imposed thereon, are positioned on the top and bottom surface of the flat spring 17. Two resistors 18 and 18a on the obverse side and two on 18' and 18'a on the reverse side of 17, are employed; each resistor having terminal ends 19 and 20 insulated from each other and from the flat spring. These bonded resistors, generically referred to as filaments, may be film patterns deposited on the insulated surface of 17, or the elements may be fine wires or foil and are those conventionally used for bonded strain gages. These are well known and commonly employed widely, as will be understood by those skilled in the art. No further description seems necessary.

The terminal ends 19 and 20 are connected to terminals 21, and the terminals are connected by wires 22 which are positioned within the conduit cable 23 around tube 24, and connected to suitable terminal connectors.

The sides 9 are notched at 7' to receive the ridges 7 when the plug 8 is inserted into the split section 6 to close the lumen. The ends of the space 13 are closed by means of a non-metallic diaphragm 24' made of a material which will not irritate the artery nor be attacked by the body fluids. Such materials are well known; one example is made of Silastic. The diaphragm may be flexible or be sufficiently slack so as not to impede the deflection of the head 14. The diaphragm is connected at its periphery to the sides 9, bottom 12 and to the bottom of 11, so as to completely close the space 13.

The cable 23 is connected to the end 12 and carries the electrical conduits for the resistors for connection into a Wheatstone bridge configuration.

A hollow tube 24 terminating in the space 13 extends the length of the conduit 23 and terminates in any ambient space to maintain the desired ambient or other pressure in space 13. A terminal connection at the end of the conduit 23 is provided.

The cable terminal connectors for the blood pressure transducer and for the flow meter are not shown since they may be those conventional for the flow meters described.

With the periarterial pressure transducer 8 removed, the exposed artery is introduced through the split 6 and the pressure transducer 8 is inserted into split 6 to completely encase the artery. It will be seen that the artery makes a close contact with the inner surface of the lumen 1, and is slightly depressed by the head 14 which depends below the cylindrical inner surface of the lumen. The blood pressure in the artery thus causes a partial deflection of the flat spring 17 and introduces a strain which increases the tension in the strain gages on the underneath side of 17 and a compression of the strain gages on the upper surface of spring 17. These four elements are connected into a Wheatstone bridge arrangement in the conventional form, and when the bridge is energized an output is obtained which will be proportional to the deflection of spring 17 and therefore, the blood pressure exerted against 14. This output may be either read or recorded. The blood flow may also be simultaneously obtained and recorded in the conventional manner. By recording the blood pressure and blood flow in superposed position on a chart of the recorder, the relation of the blood pressure to blood flow can be easily assessed. Thus, the output of the bridge can be fed through electrical conduit 23 and amplifier 24, to the recorder 26 and the electrical wires 5 from the electrodes 3 and 4, may also be passed through an amplifier 25 and the output fed into the recorder 26. The recorder may display, and will record a trace of the blood flow rate and its variation, and the simultaneous blood pressure and its variation at the same locality and occurring at the same time. It will be observed, that in such a system, no magnetic field is generated in the transducer which could affect the performance of the blood flow meter. Furthermore, there is a complete electrical insulation between the electrical elements of the blood pressure transducer and the artery, and therefore, there is no extraneous electrical field to affect or modify the potential established between 3 and 4 as a result of blood flow.

The membrane 24', by sealing the internal portions of the blood pressure transducer, prevents the introduction of any body fluids into the cavity 13, which otherwise would affect the performance of the unit by imposing a resistance to deflection of spring 17, and may even cause short circuit effects unless suitable insultation is otherwise provided. This is aided by the venting of the space through the tube 24. This vent tube thus permits the gage to report pressure above atmospheric, or whatever be the ambient pressure.

The resultant data will include both the blood pressure cycle and the simultaneous blood flow at the same locality. The device may also be used for chronic implantation, and for this purpose the combination of the flow meter, i.e. flow transducer and the pressure transducer, is particularly advantageous in reducing the amount of artery which need be exposed.

While I have described particular embodiments of my invention for the purpose of illustration, it should be understood that various modifications and adaptations thereof may be made within the spirit of the invention, as set forth in the appended claims.

I claim:

1. A combined blood pressure and blood flow measuring device, comprising:

a lumen, an opening in said lumen, means positioned in said lumen for producing a signal responsive to blood flow in an artery, when an artery is in said lumen, said means including an electromagnetic coil positioned in said lumen to produce a magnetic field, a pair of electrodes at the inner surface of said lumen spaced apart in a direction transverse to said magnetic field, and separate electrical leads connected to said coil and said electrodes; and a blood pressure transducer mounted in said opening and responsive to blood pressure occurring in said artery at a locality substantially the same as the locality in said artery at which said blood flow is determined, said transducer including a housing removably positioned in and closing said opening, a pressure head in said housing, an opening in said housing, said head depending through said opening into said lumen, a flexure connecting said head and said housing, a plurality of strain sensitive resistors mounted in said housing and connected to said head, certain of said strain sensitive resistors increasing in tension and certain other of said strain sensitive resistors decreasing in tension on deflection of said head responsive to said blood pressure.

2. The device of claim 1, a diaphragm enclosing said head and the opening in said housing.

3. The device of claim 1, said flexure being a flat spring connecting said head to said housing and said strain sensitive means being strain sensitive filaments bonded to the reverse and obverse side of said flat spring.

4. The device of claim 3, a diaphragm enclosing said head and the opening in said housing.

References Cited

UNITED STATES PATENTS 3,149,492  9/1964  Weinborg _____ 73—393
3,240,207  3/1966  Barker et al. _____ 128—2.05

OTHER REFERENCES

Brene, "Dynamic Calibration," pp. 125–137, American Journal of Medical Electronics, April–June 1964.

RICHARD A. GAUDET, *Primary Examiner.*

S. BRODER, *Assistant Examiner.*